Dec. 22, 1970 J. RABINOW 3,550,119

CHARACTER READING MACHINE PROVIDED WITH AN ARRAY OF LIGHT-EMITTING DIODES

Filed June 4, 1968 2 Sheets-Sheet 1

INVENTOR
Jacob Rabinow

BY Joseph A. Genovese

ATTORNEY

Dec. 22, 1970 J. RABINOW 3,550,119

CHARACTER READING MACHINE PROVIDED WITH AN ARRAY OF LIGHT-EMITTING DIODES

Filed June 4, 1968 2 Sheets-Sheet 2

INVENTOR
Jacob Rabinow

BY Joseph A. Genovese

ATTORNEY

United States Patent Office 3,550,119

Patented Dec. 22, 1970

3,550,119
CHARACTER READING MACHINE PROVIDED WITH AN ARRAY OF LIGHT-EMITTING DIODES

Jacob Rabinow, Bethesda, Md., assignor to Control Data Corporation, Rockville, Md.

Filed June 4, 1968, Ser. No. 734,272
Int. Cl. G06k *9/12*
U.S. Cl. 340—146.3 3 Claims

ABSTRACT OF THE DISCLOSURE

A character reading machine provided with an electroluminescent array of light-emitting diodes arranged to provide a "black on white" and a "white on black" image of each character to be identified. The images of a pair are compared simultaneously to an optical mask having a negative and a positive portion for the respective images to recognize the character. For parallel comparison a single photocell and a single mask containing a negative and a positive portion are used for each character in the machine vocabularly. For sequential comparison only one photocell is needed and the mask set is moved with respect to the photocell. However, in sequential comparison (as in parallel comparison) the single photocell is exposed simultaneously to both portions of a mask for a given character.

The electroluminescent array of diodes which produce the image pairs of each printed character are driven in a manner to cause the images to undergo vertical excursions. This either solves or alleviates the vertical registration problem common to most if not all types of reading machines.

This invention relates to reading machines and particularly to an optical mask type of machine which is very easily adjusted to read numerous different fonts.

Optical mask machines have been designed to operate by parallel comparison of a plurality of images of the same printed character with a mask for each character in the machine vocabulary together with a photocell for each mask. Pat. No. 2,933,246 illustrates such a machine. Other machines use sequential comparison wherein an image of the printed character is projected onto the masks of a set sequentially as the mask set is moved. A single photocell is used for each comparison as shown in Pat. No. 2,026,329. Although my invention is applicable to both machine designs, the following description deals primarily with the parallel comparison design solely in the interest of brevity.

Over the years (Pat. No. 2,026,329 was filed in 1929) there has been a great deal of development effort expended on optical mask reading machines. This class of machine offers several inherent advantages over the more successful (commercially) machines which use electronic masks, e.g., resistor adders as in Pat. No. 3,104,069, or logic tree as charater standards or criteria instead of optical masks. One advantage of the mask machine is simplicity and comparatively low cost. Another is the comparative ease with which the machine can be adjusted to read any font. It is expensive and difficult and sometimes nearly impossible from a practical standpoint, to alter the capability of most classes of machines to read fonts different from those for which the machines were orginally designed. Whereas an optical mask machine can be adjusted to read any font by little more than substitution of the optical masks of the machine. Another advantage of the mask machine is its resolution. Even the most primitive mask machine compare an almost perfect image of the character as printed to what can be a nearly optically perfect mask of a precise configuration. On the other hand electronic mask, logic tree and other types of machines use images or information which is resolved from fractions of the printed character. While resolution can be made very high in such machines, there is the companion expense.

As progress was made in mask machines, certain difficulties became apparent. For instance, recognition of subset or near subset characters was a formidable problem. The E and F is an example where the F is a subset of the E. After solution of this problem, Pat. No. 3,167,744 evidences another step wherein near-subset characters are more easily recognized by using mask-sets consisting of assertion and negation masks as these terms are defined in that patent. However, the number of required photocells was increased though not doubled, as certain of the assertion and/or negation masks are shared for several characters. In any event, the attractive one-mask and one-photocell for each character to be recognized was compromised. My present invention enables reversion to one-mask, one-photocell while retaining the pertinent benefits disclosed in Pat. No. 3,167,744. More specifically the aforesaid character image and optically inverted image of my diode array are compared to positive and negative portions of the mask behind which there is only a single photocell.

To clarify certain semantics, I have referred to an array of electroluminescent diodes producing two images optically inverted relative to each other. The array can be physically separated into two sections for convenience and it will still be an array. Secondly, I refer to a single mask with a negative and a positive portion. The portions may be physically separated, however, together they comprise a single mask. With respect to my invention, the important thing is that one photocell is concurrently exposed to both the negation and the assertion portion of the mask which results in an overall reduction in necessary photocells. Not only is this an economy of hardware, but it reduces the problem of maintaining the gain of all photocells equal. Obviously, it is easier to maintain the gain constant over ten photocells than it is fifteen or twenty. It should be remembered that photocells differ in characteristics, gain is nonlinear, and they drift with temperature and age. The above applies to the photocells for the various characters. In machines like that disclosed in Pat. No. 3,167,744 the assertion mask photocell must have its gain equal to the negation mask photocell for the same character. This problem is completely eliminated by my invention because the same photocell is used with both the assertion and the negation mask portion.

The old problem of vertical registration common to all types of reading machines has endured, perhaps with greater force, in optical mask machines. Solutions to the vertical registration problem are primarly in the posture of other types of machines. A few examples of this are found in the following Pats. Nos. 3,104,369 and 3,104,371 and 3,271,740 and 3,264,469 and 3,069,494 and 3,179,923 and 3,142,761. For the mask type machines we find only image oscillation, e.g., Pat. No. 2,933,246 or displaced multiple masks for the same character as in Pat. No. 2,795,705. My invention provides a new solution to the vertical registration problem and it is particularly well suited for optical mask machines. Specifically, the optically inverted images of the printed character produced on the diode array can be electrically driven at much higher speeds than before in vertical exclusions to traverse the masks during normal horizontal motion of the character.

An object of my invention is to provide an optical mask reading machine having a single photocell which provides a signal corresponding to the correlation of optically inverted images of a printed character with a character criterion mask having a negative and a positive mask portion.

Another object of my invention is to produce the above images of a printed character on an electroluminescent array of diodes which afford the capability of producing inverted images at the necessary very high speeds and also the capability of shifting the images at high speeds to cope with the vertical registration problem.

A further object of my invention is to provide an optical mask reading machine which is inherently easily adjustable to read many if not all possible different fonts by mask substitution, with a combination of means for producing negative and positive image pairs of each printed character and masks having assertion and negation portions so arranged that a single photocell is exposed simultaneously to the assertion and negation mask portion of the mask for a character, whereby the single photocell automatically cross correlates the assertion and negation correlation values, and the resulting photocell signal reflects true cross correlation because drift and nonlinearity between multiple photocells used in recognition of one character, to accomplish the same result in prior machines is completely eliminated by above described use of a single photocell.

Other objects and features will become apparent in the description of the forms of the invention illustrated in the drawings wherein.

BACKGROUND

Figure 1:
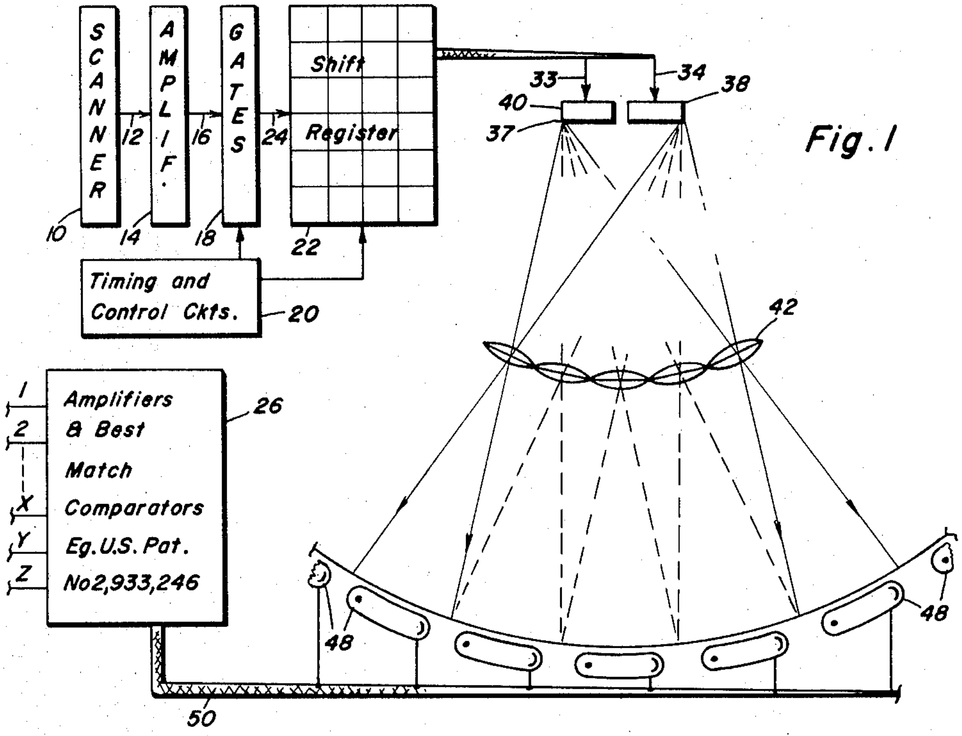
FIG. 1 is a schematic view showing one form of my invention.

FIG. 1 shows an optical character reading machine constructed of subassemblies similar to corresponding subassemblies disclosed in Pat. Nos. 3,104,369 and 2,933,246 except for those features which fulfill the aims of my invention. Thus, as in Pat. No. 3,104,369 I have shown scanner 10 to examine a printed character and provide outputs over the wires of cable 12 corresponding to the optical density of the small pieces making up the complete examined character-area. The outputs are amplified as at 14 and conducted over cable 16 to the register loading gates 18. The gates are strobbed in time with the horizontal motion of the character area by clock signals from the timing and control circuits 20. Accordingly, the shift register 22 is loaded via the gate output lines 24 to ultimately store an electronic image of the character area. Thereafter the register is shifted by a signal from control circuits 20 to move the stored information as it is compared to electronic character criteria. Comparator 26 under control of circuits 20 selects the "best match" of the stored information with the criteria as the true scanned character. While all of the preceding can be identical to Pat. No. 3,104,396, optionally the comparator 26 may be similar to FIG. 2 of Pat. No. 2,933,246 which directly accepts photomultiplier signals for processing and for a "best match" determination rather than accepting correlation signals as in Pat. No. 3,104,369.

I have mentioned assertions and negations applied optically as disclosed in Pat. No. 3,167,744. That patent refers to the earlier Pat. No. 3,104,369 for a discussion of electronic assertions and negations, and FIGS. 3 and 4 herein summarize that discussion. Register 22 (fragmentarily shown in these figures) is constructed of flip-flops connected by steering circuits (not shown) to function as a conventional shift register. Each flip flop and hence each register stage, has two outputs available on separate conductors. Consider, for example, flip-flop 32 at the upper position in FIG. 4. When a photocell 11 of scanner 10 experiences a dark part of the scanned area its signal ultimately (via amplifiers 14 and gates 18 of FIG. 1) reaches register 22, e.g., flip-flop 32 shown in FIG. 4. The "dark" information signal will set flip flop 32 and cause distinguishable signals to appear on its assertion output line 33 and its negation output line 34. Assume that the signals are +6 volts and 0 volts respectively. However, when the photocell 11 (lower part of FIG. 4) experiences a light part of the character area, flip-flop 32 is not set, and the values of the assertion and negation signals are reversed, i.e., the assertion signal on line 33 is 0 volts and the negation signal on line 34 is +6 volts. At the proper time in the character recognition cycle the flip flops of the register are cleared by a signal from control circulits 20 via reset lines 36 as fully described in Pat. No. 3,104,369.

OPTICAL MASK CORRELATION

My machine uses the assertion and negation signals on lines 33 and 34 of each stage of register 22 to form two images of the character whose scanner-extracted information is stored in register 22. One image is "black on white" (positive) and the other is "white on black" (negative), and this is accomplished by grouping all of the assertion lines 33 and all of the negation lines 34 and connecting them to an assertion 37 and a negation 38 part of an array 40 of electroluminescent diodes 41.

Figure 2:
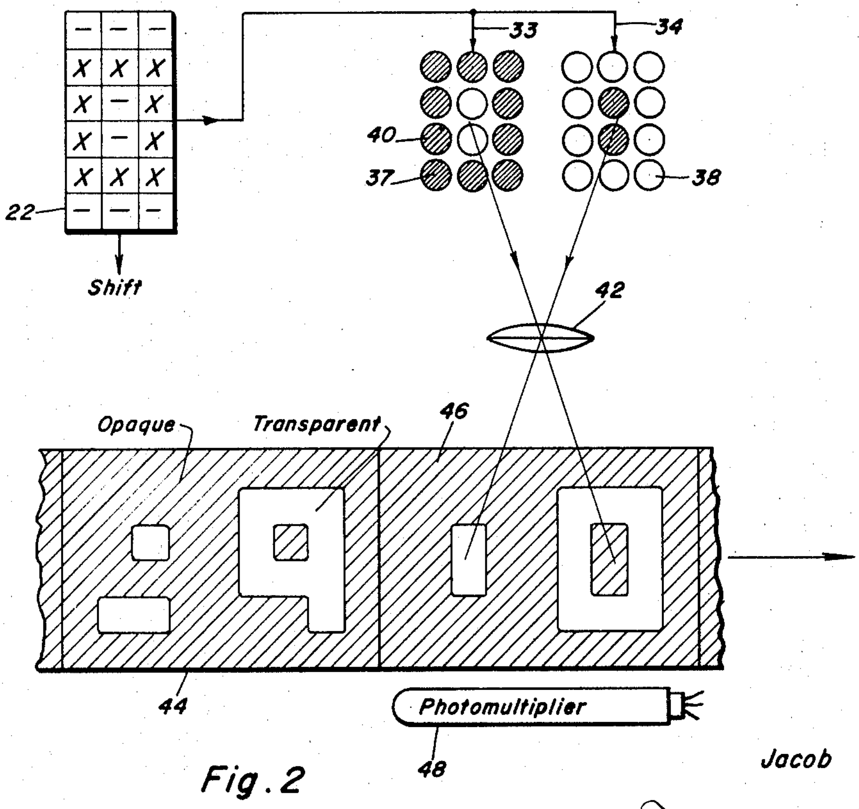
FIG. 2 is a schematic partially side and partially elevational view of another embodiment of my invention.

Images of the array 40 (FIG. 1) are formed by lenses 42 onto the surface of a strip containing masks of each character that the machine is expected to identify. Two typical masks 44 and 46 are shown in FIG. 2 although in a different embodiment of my invention. Each mask, e.g., mask 44 for a "9" has a negation portion and an assertion portion. The mask 46 for the zero is also made of a negation portion (the part for the center of the zero being transparent and the balance opaque), and an assertion portion (the part for the outline of the zero being transparent and the balance opaque).

A photocell 48, e.g. a photomultiplier, is optically aligned with each mask consisting of its assertion and its negation portion (FIG. 1). FIG. 2 differs only to the extent that there is only one photocell 48 and the masks are movable to sequentially align them with the array 40 and the photocell. In FIG. 1, the masks are stationary. In either case, the correlation signals from the photocells are conducted on cable 50 to the amplifiers and comparator circuits 26 where the "best match" is selected as the true character just as in Pat. No. 3,104,369 or 2,933,-246.

Returning to array 40 of electroluminescent diodes 41, these can be selected from a group of several known diodes. For example, they can be gallium arsenide phosphite diodes or gallium aluminum arsenide or gallium phosphide doped with zinc and oxygen, all of which respond very fast. They exhibit the property of emitting energy through the visible band when driven by an electrical signal. I have shown diodes 41 in FIG. 4 illuminating when forward-driven to ground over the assertion and negation lines. It is to be noted that energy which is not in the visible range, e.g., infrared, emitted by the diodes 41 can be detected by selected photocells 48 and therefore can be used.

FIG. 2 shows by + and − signs the respective assertion and negation wires which will conduct a +6 volt signal (+6 volts arbitrarily chosen as an example) when the character "0" has been scanned. All of the assertion wires 33, therefore, will produce an image (positive) as shown on the left part 37 of array 40. At the same time the signals on the negation wires will energize the right part 38 of array 40 to produce the illustrated negative image. Lens 42 forms an image of the array on mask 46 as illustrated, and (FIG. 2) will for man identical image on each subsequent mask as the mask strip is moved.

Figure 3:
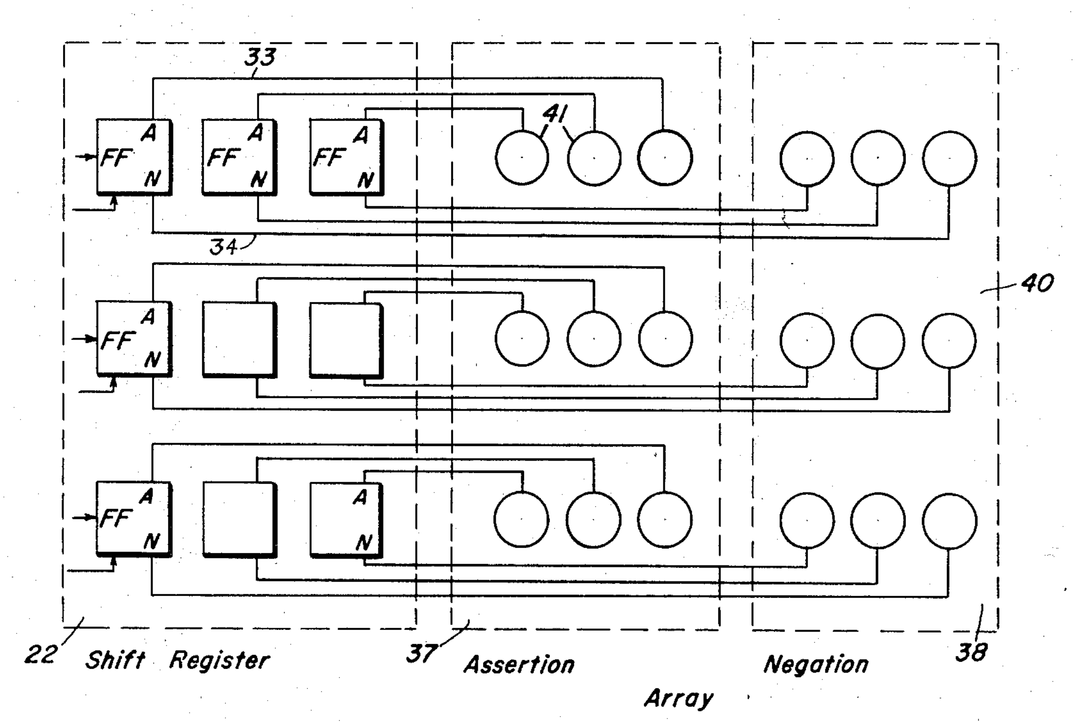
FIG. 3 is a schematic view of two components of my invention shown in FIGS. 1 and 2.
Figure 4:
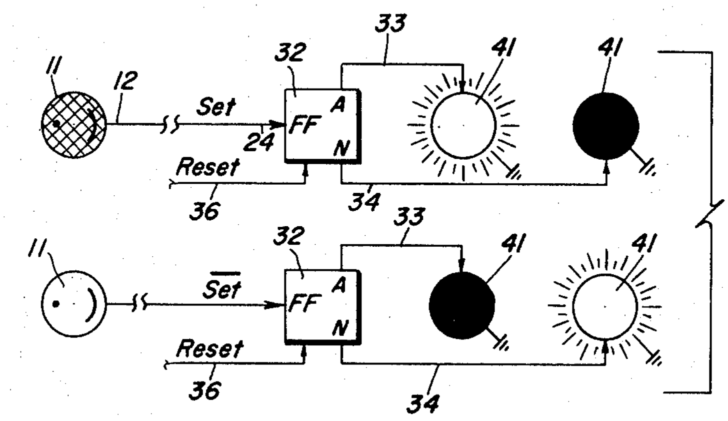
FIG. 4 is a schematic view to aid explanation of my electroluminescent array of diodes.

The specific register-to-array wiring is shown in FIGS. 3 and 4. The assertion wires of the flip-flops are connected to the respective cells of the assertion part 37 of array 40, and the negation wires are connected to the cells of the negation part 38 of the array 40. With such interconnection the diode cells are slaved to the information which is shifted in register 22. Thus, as is the register operation in Pat. No. 3,104,609, the information pertaining to the entire scanned character and its background can be vertically shifted at electronic speeds with the result that the images on array 40 similarly shift. This greatly alleviates the vertical registration difficulties encountered in reading machines.

As described and as shown in FIGS. 1 and 2 particularly the latter, the single photocell 48 is exposed to the light, if any, passing through both portions of the mask. In other words, both the total cross correlation between the negative and positive images of the character on array 40 and the negative and positive mask portions are reflected in the photocell signal. These cross-correlated signals are impressed on comparator circuits 26 for character identity decisions.

It is understood that various changes may be made without departing from the scope of the following claims.

What is claimed is:

1. In an optical character reading machine which has a scanner to examine a character and its background and provide scan information signals corresponding thereto, temporary storage means responsive to said information signals to store an electronic representation of the character and its background, means to shift said representation to many locations in said storage means, and array of electroluminescent photo emissive members operatively connected to said storage means to provide negative and positive optical images of said representation in said storage means and to shift said images in coordination with the shifting of said representation in said storage means, a set of optical aligned with said array, said set including masks which have both assertion and negation portions for optical alignment with said positive and negative optical images on said array, photosensitive means associated with both portions of a mask to provide an electrical signal in response to the correlation of said negative and positive images with said mask portions, and means responsive to said electrical signal for identifying the scanned character.

2. The subject matter of claim 1 wherein said electroluminescent members are diodes of the type containing gallium in their composition.

3. The subject matter of claim 1 wherein said temporary storage means comprises a shift register composed of stages which have electrical assertion and negation outputs providing said operative connection between said storage means and said array.

References Cited

UNITED STATES PATENTS

| | | | |
|---|---|---|---|
| 3,197,735 | 7/1965 | Haynes et al. | 340—146.3 |
| 3,205,363 | 9/1965 | Heetman | 340—146.3UX |
| 3,234,392 | 2/1966 | Dickinson | 340—146.3X |
| 3,248,552 | 4/1966 | Bryan | 340—146.3X |

MAYNARD R. WILBUR, Primary Examiner

L. H. BOUDREAU, Assistant Examiner